No. 827,079. PATENTED JULY 31, 1906.
H. E. CLARK.
LATHE DOG.
APPLICATION FILED JUNE 15, 1905.
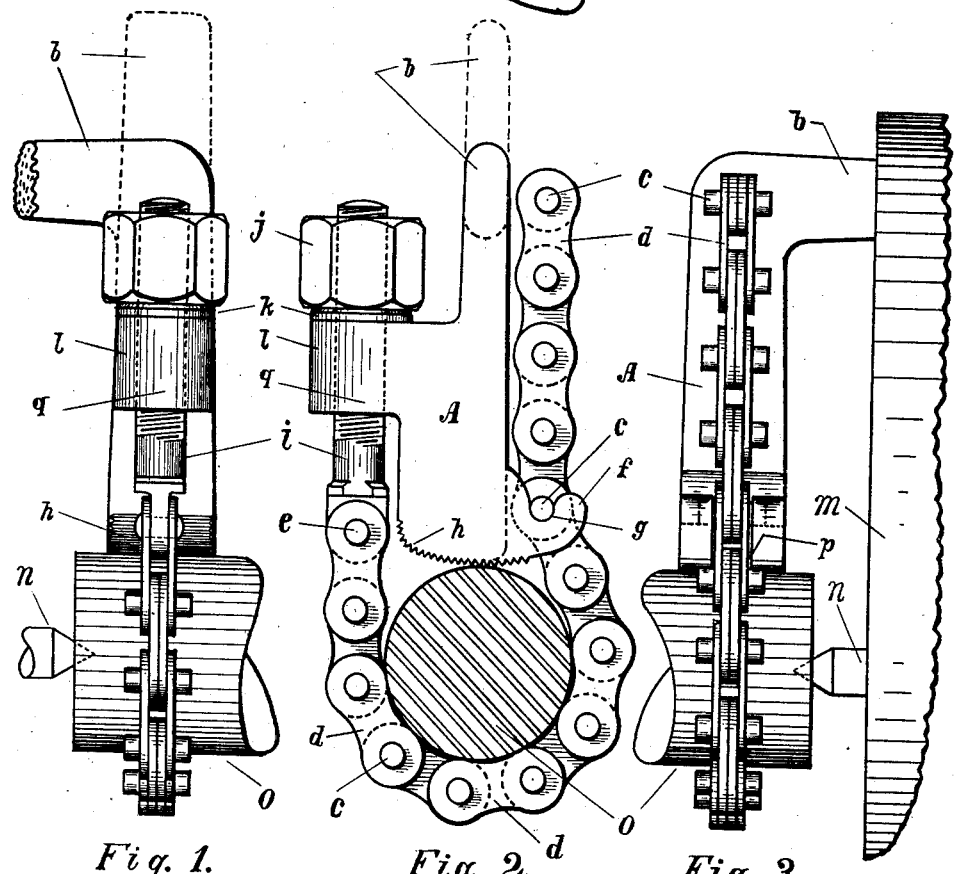

UNITED STATES PATENT OFFICE.

HUGH ELMER CLARK, OF ROCHESTER, NEW YORK.

LATHE-DOG.

No. 827,079.     Specification of Letters Patent.     Patented July 31, 1906.

Application filed June 15, 1905. Serial No. 265,401.

*To all whom it may concern:*

Be it known that I, HUGH ELMER CLARK, a citizen of the United States, residing at Rochester, in the county of Monroe and State of New York, have invented a new and useful Improvement in Lathe-Dogs, of which the following is a full, clear, and accurate description, reference being had to the accompanying drawings, forming part of the specification.

My invention relates to certain new and useful improvements in lathe-dogs.

The objects of my improvements are, first, to provide means whereby the lathe-dog may be applied and detached without removing work from lathe-centers; second, a lathe-dog adjustable to various diameters and shapes of work; third, to simplify and improve the construction of a lathe-dog whereby greater efficiency of operation is obtained and quicker adjustment made possible.

With these and other ends in view my invention consists in the simple construction and arrangement of the parts hereinafter described, and shown in the accompanying drawings.

In the drawings is shown an embodiment of the invention; but it is to be understood that various modifications and changes may be made in the general and detail construction without in the least departing from the nature and principle of the invention.

Figure 1 is a front elevation. Fig. 2 is a side elevation. Fig. 3 is a back elevation showing lathe-dog in connection with face-plate and work on center. Fig. 4 is a plan. All four views show the lathe-dog gripping a shaft.

Similar letters refer to similar parts throughout the several views.

The body $A$, the claws $f$ and $f'$, the lug $l$, and the tail $b$ constitute the rigid part having a curved serrated face $h$, which when the lathe-dog is clamped clutches the work $o$. The pintles or studs $c$, the clevises $d$, the pin $e$, the bolt $i$, the nut $j$, and the washer $k$ constitute the adjustable part. The claws $f$ and $f'$ with the slot $p$ between them are designed to receive the flexible clamp $d$. The recesses $g$ and $g'$ in said claws $f$ and $f'$ are adapted to receive the pintles or studs $c$ of said flexible clamp $d$, which constitutes the rough adjustment of the lathe-dog to the work $o$. The flexible clamp $d$ has a bolt $i$ attached to same by means of the fulcrum-pin $e$, said bolt passing through the hole $q$ in the lug $l$ and having a threaded end to receive the tapped nut $j$ and the washer $k$, whereby the final adjustment or clamping is obtained on the work. This lathe-dog is so designed that torsional strains induced by working the material $o$ tend to cause the dog to grip the work tighter. For example, when the face-plate $m$ is rotated there is an accompanying rotation of the lathe-dog and material $o$ on center $n$, causing the dog to tip, which obviously tightens the grip of the dog on the material. Said grip is further tightened by the resistance to said rotation, caused by working the material.

The peculiar form of the flexible clamp employed as one of the holding parts in the lathe-dog is readily adapted to the larger adjustment and enables work of large size to be as readily and quickly secured in the lathe-dog as work of smaller size, as the degree of adjustment in finally clamping and holding the work by means of the bolt $i$ and the nut $j$ will be the same in any case, whether the work $o$ be comparatively small or large that is clamped in the lathe-dog.

Having thus described my invention, I claim as new and desire to secure by Letters Patent—

1. A lathe-dog, having claws, a flexible clamp, a projecting lug with a hole through the same, a bolt seated in said hole, having one end attached to the flexible clamp, a nut on the bolt, and means whereby said flexible clamp may be detachably secured to the claws; substantially as described.

2. A lathe-dog, having claws, a flexible clamp, a projecting lug with a hole through the same, a bolt seated in said hole, having one end attached to the flexible clamp, means whereby said flexible clamp may be detachably secured to the claws, and a nut on the bolt adapted for adjusting said flexible clamp; substantially as described.

HUGH ELMER CLARK.

Witnesses:
   HENRY T. CLARK,
   JAMES C. LANEY.